US005544049A

United States Patent [19]
Henderson et al.

[11] Patent Number: 5,544,049
[45] Date of Patent: Aug. 6, 1996

[54] METHOD FOR PERFORMING A SEARCH OF A PLURALITY OF DOCUMENTS FOR SIMILARITY TO A PLURALITY OF QUERY WORDS

[75] Inventors: Richard D. Henderson, San Jose; Michael J. Barbarino, Moss Beach, both of Calif.

[73] Assignee: Xerox Corporation, Stamford, Conn.

[21] Appl. No.: 447,317

[22] Filed: May 22, 1995

Related U.S. Application Data

[63] Continuation of Ser. No. 240,285, May 9, 1994, abandoned, which is a continuation of Ser. No. 953,166, Sep. 29, 1992, abandoned.

[51] Int. Cl.[6] ................................................. G06F 17/30
[52] U.S. Cl. ................................ 364/419.19; 395/600
[58] Field of Search ......................... 364/419.19, 419.13, 364/200.75, 900.75, 419.07; 395/600

[56] References Cited

U.S. PATENT DOCUMENTS

| | | | |
|---|---|---|---|
| 4,358,824 | 11/1982 | Glickman | 364/200 |
| 4,554,631 | 11/1985 | Reddington | 364/300 |
| 4,823,306 | 4/1989 | Barbic et al. | 364/900 MS |
| 5,263,159 | 11/1993 | Mitsui | 395/600 |
| 5,404,514 | 4/1995 | Kageneck et al. | 364/419.19 |

FOREIGN PATENT DOCUMENTS

| | | |
|---|---|---|
| 0304191 | 2/1989 | European Pat. Off. |
| 0501416 | 9/1992 | European Pat. Off. |
| 20059861 | 2/1990 | Japan . |

OTHER PUBLICATIONS

Petrovski, "What a trip!" (Software Review), HP Professional, v6, n10, p. 60(3), Oct. 1992, Dialog file 275, Acc # 01539281.

"Text Search and Retrieval Training Manual for the Automated Patent System", May 1991.

News/Retrieval builds a better mousetrap, O'Leary Mike Information Today, Sep. 1, 1989, v6 n8 p. 9–11, ISSN 8755-6286.

BRS Software Producto, BRS Search, 1992.

Business Software Database (TM), Target, "Don't Get Enmeshed in the Net", Information World Review V88 p. 18(2), 1994.

Weinberg, 'Word Frequency Data in Full text Database Searching' National on–line Meeting Proceedings 1984 pp. 425–432.

Turtle, Howard T., "A Comparison of Text Retrieval Models," The Computer Journal; vol. 35, No. 3, pp. 279–290; Jun., 1992.

Lucarella, D., "Heuristics to Locate the Best Document Set in Information Retrieval Systems," Eighth Annual International Conference on Computers and Communications; 567–571; Mar. 22, 1989.

"A Law of Occurrences for Words of Low Frequency" by Andrew D. Booth, Information and control, 1967 pp. 386–393.

*Primary Examiner*—Donald E. McElheny, Jr.
*Assistant Examiner*—Frantzy Poinvil
*Attorney, Agent, or Firm*—Oliff & Berridge

[57] ABSTRACT

A method for performing a search of a plurality of documents for similarity to a query word includes retrieving a first document, and determining a number of occurrences of the at least one query word in the first document. Then, a next document is retrieved and a number of occurrences of the at least one query word in the next document is determined. The steps are repeated until each of the plurality of documents have been retrieved, and the number of occurrences of the at least one query word has been determined in each of the plurality of documents. The query word can include a plurality of query words, all of which are searched in each document, in turn, rather than being searched word by word in the whole collection of documents. The documents are then ranked according to the number of occurrences of the query words determined in each document, and a list of documents is produced according to the document ranking.

20 Claims, 3 Drawing Sheets

5,544,049

METHOD FOR PERFORMING A SEARCH OF A PLURALITY OF DOCUMENTS FOR SIMILARITY TO A PLURALITY OF QUERY WORDS

This is a Continuation of application Ser. No. 08/240,285 filed May. 9, 1994, now abandoned, which in turn is a continuation of application Ser. No. 07/953,166 filed Sep. 29, 1992 now abandoned.

BACKGROUND OF THE INVENTION

1. Field of the Invention

This invention relates to improvements in text and image processing methods and techniques, and more particularly to improvements in methods for word or term identification and location in document images, and still more particularly to improvements in methods for computer searching a number of document images for existence of query words or terms with reduced memory requirements.

2. Description of the Relevant Art

There has been increasingly widespread interest in document processing, both in electronic and in paper document forms. Often it is desired to locate particular search terms within a large corpus of documents; for example, in performing research to locate papers or publications that pertain to particular subjects, in finding particular testimony in deposition or discovery documents that contain particular words or phrases, in locating relevant court decisions in a legal database that have certain key words, and in manifold other instances.

Sometimes the documents are presented in electronic form in which the document text and images have been encoded in an electronic memory media from which the documents can be retrieved for perusal or for "hard copy" or paper reproduction. In the past, when a large number of such documents are to be searched to locate one or more query terms, usually words, an index is built against which the query terms are compared. Such index generally is formed of two parts. The first part is a document identifier (herein the "document id"). The document id is merely an identification of each document in the collection, and may be a number, key word or phrase, or other unique identifier. The second part is a word and the number of times the word appears in the document with which it is identified (herein the "word frequency").

In the past, as shown in FIG. 1, to identify the particular documents in which search or query words exist, usually the index of all of the words is brought into a computer memory 10, and the query words are compared, one at time, against each of the words in the memory. As each word is compared, a "score" is kept of the documents in which it appears. Thus, a first query word is processed 11, and a partial "score" is computed 13 for the first word. Then a next query word is processed 14, and a cumulative "score" is computed 16. As the successive query words and cumulative scores are processed until completed 17, the cumulative score is continued to be generated. After the last query word has been searched, the "scores" can be used to identify or sort the documents 18 in order of the number of "hits" by the query words, and a list of documents found can be displayed 19.

Such techniques, however, require a large amount of computer accessible memory, particularly for large document collections. The memory requirement often makes it impractical for document searching on personal or portable computers, even if the documents are stored on large capacity memory disks, and generally require large, mainframe computers with associated large memories.

In the field of image processing, recently, direct paper document searching techniques have been proposed in which one or more morphological properties of the images on the document are processed and used for comparison against a query word, term or image. In accordance with such techniques, a document is scanned and the morphological properties of its various images directly determined without decoding the content of the image. In performing searches of a large corpus of documents, however, one technique that can be used is to generate an index similar to that described above, but with a list of frequencies of morphological properties used in place of the words. Again, especially in large document collections, a large amount of memory is required to perform search queries.

SUMMARY OF THE INVENTION

In light of the above, it is, therefore, an object of the invention to provide an improved method for performing a similarity search on a large collection of documents using less memory than conventional methods heretofore employed.

It is another object of the invention to provide an improved method of the type described that can be performed efficiently.

In accordance with a broad aspect of the invention, a method for performing a search of a plurality of documents for similarity to a query term or word is presented. The method includes retrieving a first document, and determining a number of occurrences of the query word in the first document. The method then includes retrieving a next document and determining a number of occurrences of the query word in the next document. The steps are repeated until each of the plurality of documents have been retrieved, and the number of occurrences of the query word has been determined in each of the plurality of documents.

The query word can include a plurality of query terms, all of which are searched in each document, in turn, rather than being searched term by term in the whole collection of documents. The documents are then ranked according to the number of occurrences of the query words determined in each document, and a list of documents is produced according to the document ranking.

In one embodiment, a list of words contained within the retrieved document is generated, and the query words are compared to the generated list of words.

In another embodiment, all of the query words are compared against a first portion of the documents. Subsequently, all of the query words are compared against a second portion of the documents. The documents are then ranked, according to the number of occurrences of the query words determined in each document, and a list of the documents is generated according to the document ranking.

In another embodiment, the documents are organized into an inverted index. In this case, instead of retrieving a document, the segment of a list of document-id and term-frequency pairs related to the query term and the document is examined.

BRIEF DESCRIPTION OF THE DRAWINGS

The invention is illustrated in the accompanying drawing, in which.

DETAILED DESCRIPTION OF A PREFERRED EMBODIMENT

This invention relates to techniques for performing similarity searches of the type in which the similarity search is performed with a query formed of a sequence of one or more words, syllables, phrases, images, or the like. Although the term "query word" is used herein, it should be understood that the "word" refers to a word, a word portion, or portions of a document or image which comprises letters, numbers, or other language symbols including non-alphabetic linguistic characters such as ideograms or foreign syllabries, and word or character substitutes, such as "wildcard" characters or the like. The result of the similarity search is a ranked list of documents from the indexed collection that have the highest similarity quotient to the query. The similarity quotient of a document with regard to a query is a number that results from a user defined formula that may include the number of documents in which each query word appears, the number of times it appears in each document, and the number of documents in the corpus. In some instances, it may be desirable to include different weights to be applied that designate relative importance of query words, or order of appearance of query words, or other similar search criterion.

Figure 3:
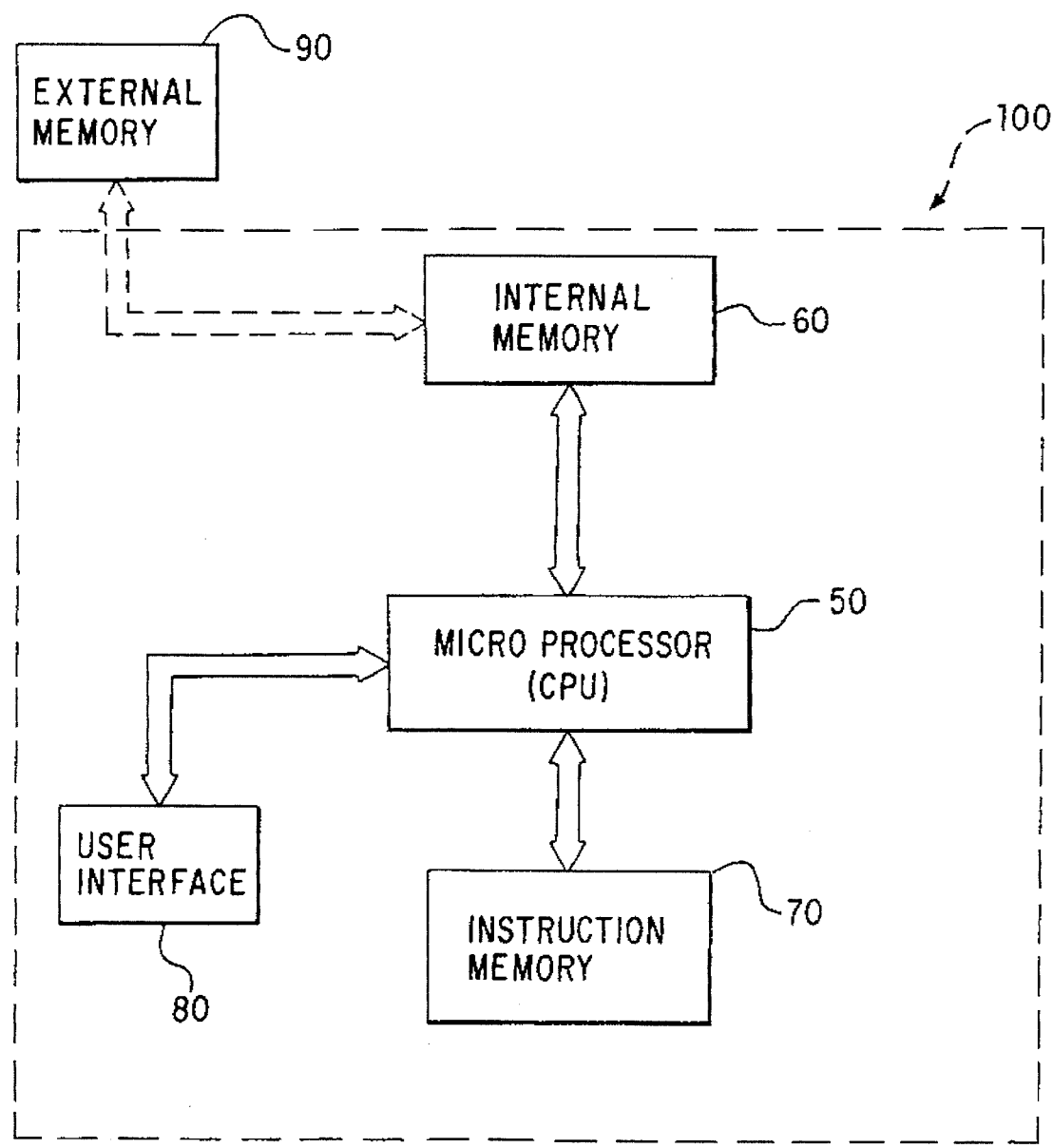
FIG. 3 is a block diagram of an exemplary general computer on which the invention can be implemented.

The method described herein is preferably implemented on a general purpose computer. Referring to FIG. 3, a general purpose computer 100 comprises a programmable microprocessor central processing unit (CPU) 50, an internal memory 60, an instruction memory 70 and a user interface (UI) 80. Data to be searched for similarity to a query is retrieved into the internal memory 60 from an external memory 90, such as, for example, a hard disk or optical disk system. The data residing in the internal memory 60 is then scanned by the CPU 50 in accordance with instructions provided by the instruction memory 70. The user inputs a multiple term query for use by the CPU 50 via the UI 80 such as, for example, a keyboard or touch screen. The CPU 50 then searches each document, in turn, for similarity to the query entered at the UI 80. Depending upon the number of "hits" or matches to the query the CPU 50 generates a "score" for each document searched and stores the results in the internal memory 70. A detailed description of the search method implemented by the general purpose computer 100 is described below.

In order to accomplish the similarity search according to the invention, an inverted index is preferably used. The inverted index contains a list of pairs of document identifiers and word frequency for each unique word in the corpus, or collection of documents. The word frequency is the number of times the word appears in the document identified by the document id with which it is paired. The document id - word frequency pairs are preferably arranged in ascending or descending order by document id.

Figure 1:
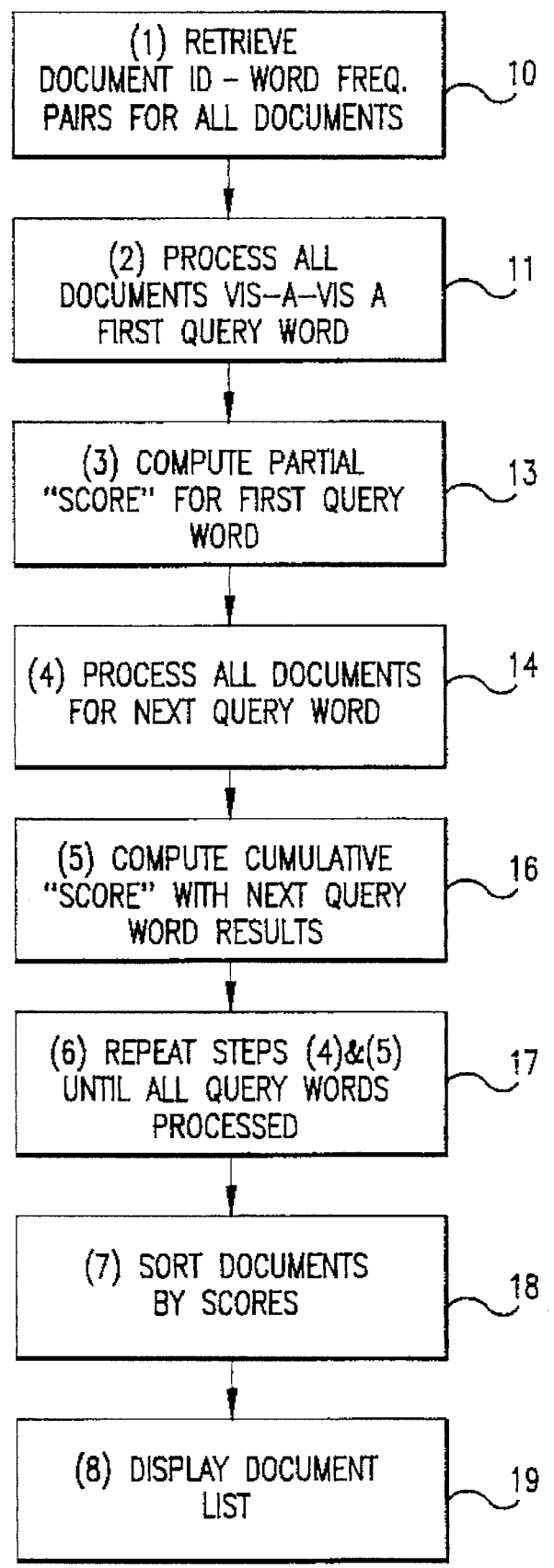
FIG. 1 is a block diagram outlining the steps for performing a similarity search of a corpus of documents, in accordance with the prior art.
Figure 2:
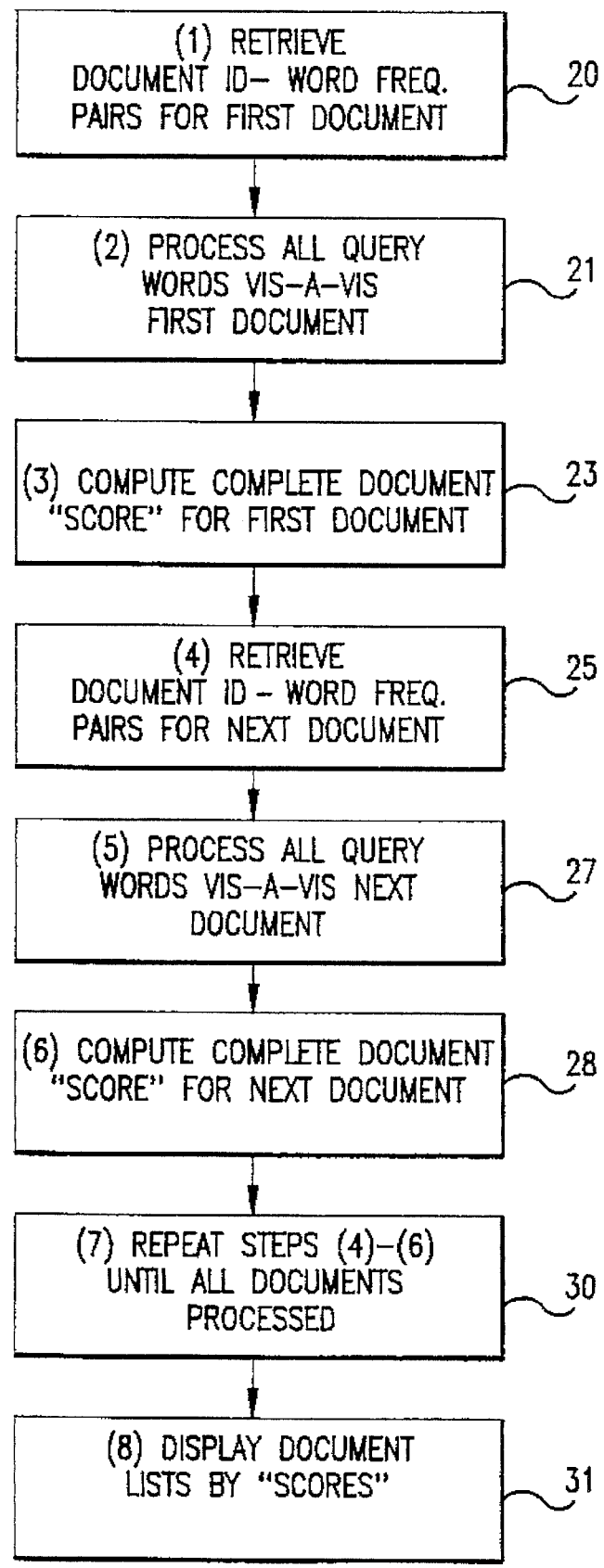
FIG. 2 is a block diagram outlining the steps for performing a similarity search of a corpus of documents in accordance with a preferred embodiment of the invention.

The method of the invention is in contrast to previous methods in which the calculation of a similarity quotient is usually made by going entirely through the list of pairs of document identifiers and word frequencies for a single query word, and as each query word is being processed, computing partial scores for each document found in the list. In accordance with the method of a preferred embodiment of the invention, with reference now to FIG. 2, rather than accessing all the document id - word frequency pairs for a query word before accessing those of another query word, the comparison is switched from one stream of document - word frequency pairs to another. Thus, all the document id - word frequency pairs for one document are visited before going on to others.

Accordingly, the document id - word frequency pairs for the first document are retrieved 20 into a computer memory. Thus, it will be appreciated that the technique of the invention is particularly well suited for use in memory constrained cases, and is analogous to an n-way merge algorithm, though in this case a merge is not being performed, but rather, a set of calculations is being done.

Next, all of the query words are compared, searched, or processed vis-a-vis the first document 21, and a complete document "score" is computed for the first document 23. In performing a similarity search in accordance with the invention, it is desirable to keep a list of all the documents in the collection, or at least a list of all the documents that have been seen in the lists being processed. This is desirable in order to track the partial score of the documents. This list can be accessed at points corresponding to the document id portions of the document id - word frequency pairs being processed. Thus, as the list for each query word is processed the document list may be accessed at increasing (or decreasing) points, depending upon the ordering of the document ids.

The process is continued by retrieving the next document id - word frequency pairs for the next document 25 into the computer memory, and again processing all of the query words vis-a-vis the next document 27, and a new "score" is computed for the next document 28. The process is continued 30 until all of the documents have been processed. Once all the query words have been processed the fully computed or cumulative "scores" are sorted into rank order and the list displayed 31. Alternatively, in order to produce a sorted list immediately at the end of the process, each time a partial score is computed, the changed document score can be repositioned in the ranking as necessary.

Again, in contrast to previous techniques in which, if there was not sufficient memory in the system to keep the whole list in memory together with the portion of the query word's list of document id - word frequency pairs being processed, most of the document list was paged in from an external store, for comparison with each query word. In the technique of the invention, one query word's stream of pairs is switched to another to make all the calculations, for example, for the lowest document id in all of the various lists before going on to the second lowest document id and so forth. In accordance with the invention, there need only be enough memory to contain the entry for one document in the document list at a time, and for each query word, one entry in the list of pairs of document id - word frequency. Since for large document collections the list of documents will be very large this enables computation with a much smaller memory requirement than previous techniques.

It will be noted that it may be necessary to perform additional computation than previous techniques in making comparisons between the identifications of the current element in the various query word lists. However, this computation is inexpensive compared to disk input/output costs.

An alternative embodiment of the method of the invention is to process some number of documents (more than one) at the same time. This number of documents could be determined at run time based on the available memory, or at compile time based on the expected target machine. Each list of document id - word frequency pairs would be processed until the document identifications exceeded the current range of document identifications being processed. Then computation would move on to the next query word list. This variation decreases the amount of extra computation done, although it does not eliminate it entirely, and requires more memory, though not as much as previous approaches.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A computer implemented method for performing a search of a plurality of documents for similarity to a query having multiple terms using an inverted index of the plurality of documents, the method comprising the sequential steps of:

(a) searching the inverted index for each of the query terms and determining a number of occurrences of the query terms in a first document;

(b) calculating a similarity score for the first document based on the number of occurrences of the query terms in the first document;

(c) searching the inverted index for each of the query terms and determining a number of occurrences of the query terms in a subsequent document;

(d) calculating a similarity score for the subsequent document based on the number of occurrences of the query terms in the subsequent document; and (e) repeating steps (c) and (d) until a similarity score has been calculated for each of the plurality of documents.

2. The method of claim 1, further comprising the step of ranking the plurality of documents based on the calculated similarity scores.

3. The method of claim 1, further comprising the step of producing a list of the plurality documents that is ordered based on the calculated similarity scores.

4. The method of claim 1, wherein the query terms comprise images, and wherein the inverted index is an inverted index of images that occur in the plurality of documents.

5. The method of claim 1, further comprising the step of storing a predetermined number of the highest similarity scores in a memory as the searching and calculating steps are performed.

6. The method of claim 1, wherein a similarity score for each document is calculated before a search is performed for occurrences of the query terms in a subsequent document.

7. The method of claim 1, wherein, the steps of calculating a similarity score comprise calculating a similarity score based on a user defined formula and a number of occurrences of the query terms in a document.

8. A computer implemented method for performing a search of a plurality of documents for similarity to a query having multiple terms using an inverted index of the plurality of documents, comprising the sequential steps of:

(a) searching the inverted index for each of the query terms and determining a number of occurrences of the query terms in a first document;

(b) calculating a similarity score for the first document based on the number of occurrences of the query terms in the first document;

(c) storing the first document's similarity score in a memory;

(d) searching the inverted index for each of the query terms and determining a number of occurrences of the query terms in a subsequent document;

(e) calculating a similarity score for the subsequent document based on the number of occurrences of the query terms in the subsequent document;

(f) storing the subsequent document's similarity score in the memory when fewer than a predetermined number of similarity scores are stored in the memory;

(g) comparing the subsequent document's similarity score to the similarity scores stored in the memory, deleting the lowest similarity score stored in the memory, and storing the subsequent document's similarity score in the memory when the subsequent document's similarity score is higher than the lowest similarity score stored in the memory and more than a predetermined number of similarity scores are stored in the memory; and (h) repeating steps (d) through (g) until a similarity score has been calculated for each of the plurality of documents.

9. The method of claim 8, further comprising the step of ranking the documents whose similarity scores are stored in the memory based on the calculated similarity scores.

10. The method of claim 8, further comprising the step of producing a list of the documents whose similarity scores are stored in the memory, the list being ordered based on the calculated similarity scores.

11. The method of claim 8, wherein the query terms comprise images, and wherein the inverted index is an inverted index of images that occur in the plurality of documents.

12. The method of claim 8, wherein a similarity score for each document is calculated before a search is performed for occurrences of the query terms in a subsequent document.

13. The method of claim 8, wherein the steps of calculating a similarity score comprise calculating a similarity score based on a user defined formula and a number of occurrences of the query terms in a document.

14. A computer implemented method for performing a search of a corpus of documents for similarity to a query having multiple terms using an inverted index of the corpus of documents, the method comprising the sequential steps of:

(a) retrieving a first portion of the inverted index corresponding to a first plurality of documents from a first memory into a second memory;

(b) searching the first portion of the inverted index for each of the query terms and determining a number of occurrences of the query terms in each of the documents in the first portion of the inverted index;

(c) calculating similarity scores for each of the documents in the first portion of the inverted index based on the number of occurrences of the query terms in the documents;

(d) retrieving a subsequent portion of the inverted index corresponding to a subsequent plurality of documents from the first memory into the second memory;

(e) searching the subsequent portion of the inverted index for each of the query terms and determining a number of occurrences of the query terms in each of the documents in the subsequent portion of the inverted index;

(f) calculating similarity scores for each of the documents in the subsequent portion of the inverted index based on the number of occurrences of the query terms in the documents; and (g) repeating steps (d) through (f) until a similarity score has been calculated for each of the documents in the corpus of documents.

15. The method of claim 14, further comprising the step of ranking the plurality of documents based on the calculated similarity scores.

16. The method of claim 14, further comprising the step of producing a list of the plurality documents that is ordered based on the calculated similarity scores.

17. The method of claim 14, wherein the query terms comprise images, and wherein the inverted index comprises an inverted index of images that occur in the plurality of documents.

18. The method of claim 14, further comprising the step of storing a predetermined number of the highest similarity scores in the second memory as the searching and calculating steps are performed.

19. The method of claim 14, wherein similarity scores for documents in each portion of the inverted index are calculated before a search is performed for occurrences of the query terms in documents in a subsequent portion of the inverted index.

20. The method of claim 14, wherein, the steps of calculating a similarity score comprise calculating a similarity score based on a user defined formula and a number of occurrences of the query terms in a document.

* * * * *